July 5, 1927.

J. HOJNOWSKI 1,635,043

AUTOMOBILE SNOWPLOW

Filed Aug. 5, 1926

Inventor

Jakob Hojnowski

Patented July 5, 1927.

1,635,043

UNITED STATES PATENT OFFICE.

JAKOB HOJNOWSKI, OF NEKOOSA, WISCONSIN.

AUTOMOBILE SNOWPLOW.

Application filed August 5, 1926. Serial No. 127,337.

This invention relates to improvements in snow removing apparatus, and more particularly to an automobile snow remover or plow, and it is the principal object of my invention to provide an automobile at its front part with a snow removing means which is adapted to be readily attached and removed from the front part of the automobile.

Another object of my invention is the provision of a suitable frame and attaching means therefor and for the snow removing means to the front part of an automobile or the like.

A further object of the invention is the provision of a snow remover of simple and inexpensive construction which may be readily attached to and detached from any make of automobile at the present time in use.

These and other objects and advantages of my invention will become more fully known as the description thereof proceeds, and will then be more specifically defined in the appended claims.

In the accompanying drawing, forming a material part of this disclosure:

Figure 1:
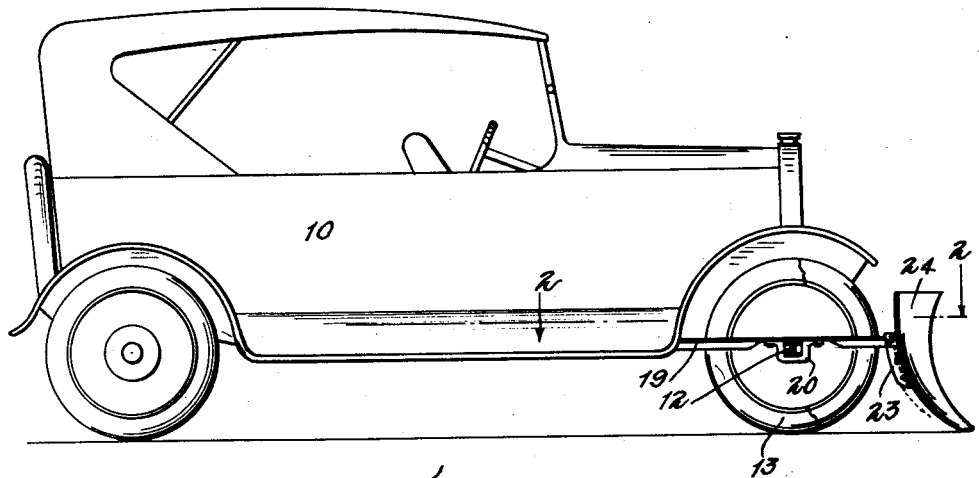
Fig. 1 is a side elevation of an automobile with the snow plow constructed according to my invention attached thereto.
Figure 2:
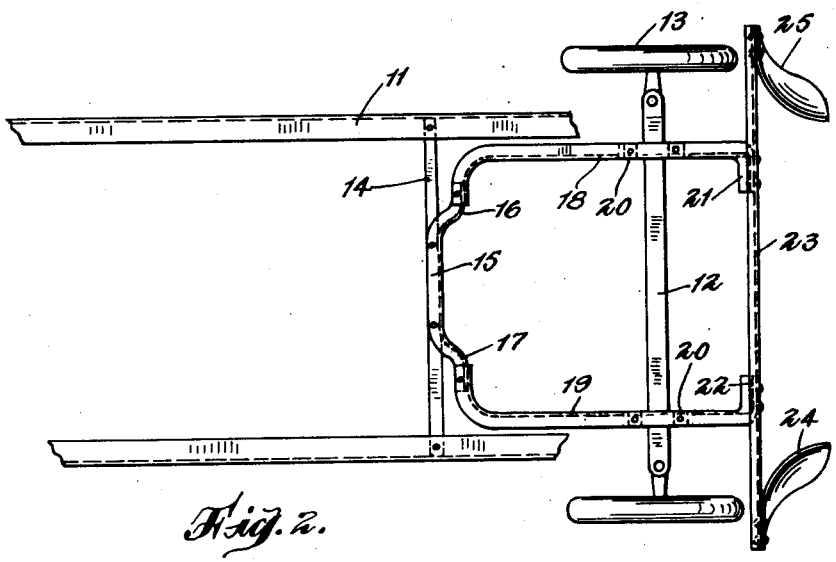
Fig. 2 is a fragmentary top plan view of the automobile frame and snow removing device attached thereto, seen in the direction of the arrows 2—2 of Figure 1.

An automobile 10 of any well known customary construction including the usual underframe 11, front axle 12, and wheels 13 attached thereto in the ordinary well known manner has the longitudinal beams of its frame connected by means of a cross-bar 14 to which is attached in any well known, suitable manner a bar 15 having curved outer ends 16 and 17 respectively spaced from the cross-bar 14.

To the free outer ends of this bar 15 are attached in any suitable manner the curved ends of frame side bars 18 and 19 respectively extending towards the front part of the automobile. Intermediate their ends these bars 18 and 19 are attached to the front axle 12 by means of brackets 20 or the like, and their extreme outer ends are bent rectangularly to the bars 18 and 19, as indicated at 21 and 22 respectively. To these parts 21 and 22 are attached the cross-bar 23 of any ordinary well known construction and the plow shares 24 and 25 respectively, which are securely fastened to the ends of the crossbar 23, and have any well known suitable shape, best suited to remove snow etc. from the front of the automobile wheels during the motion of the car under its own power.

While I have described and shown the preferred form of my device as an example of the many ways to practically construct the same, it will be clear that such changes as come within the scope of the appended claims may be made in the general arrangement of my device and in the construction of the minor details thereof, as desired and suitable, without departure from the scope and spirit of the invention and the principles involved. The operation of my device will be entirely clear from the above description, and it will be evident, that the frame with its plow shares may readily be installed on any automobile in use, and may readily be removed therefrom for instance in summer time.

Having thus described my invention, what I claim as new and desire to secure by Letters Patent is:

1. In an automobile, the combination with its truck frame including a crossbar, a bar having curved outer ends attached to said crossbar intermediate its ends, side bars having curved inner ends attached to the curved ends of said first named bar, brackets for securing said bars intermediate their ends to the front axle of a car, a front crossbar, and a plurality of snow removing implements attached to said front crossbar in front of the car wheels.

2. In an automobile, the combination with its underframe including a crossbar, of an auxiliary frame, a bar attached intermediate its ends to said crossbar having curved outer ends spaced from said crossbar, a pair of lateral frame bars having curved inner ends attached with the same to the curved outer ends of said first named bar, brackets for securing the pair of lateral bars intermediate their ends to the front axle of the automobile, rectangularly bent front parts on said lateral bars, a cross-bar attached to said rectangular parts, and snow plow shares attached to said last named cross-bar in front of the automobile wheels.

3. The combination with an automobile having a frontal cross-bar and front wheels, and a pair of plow shares, in front of said wheels, of means for readily attaching and removing said plow shares to and from the automobile, said means comprising a cross-bar to the ends of which said plow shares are secured, a bar having curved outer ends adapted to be attached to said frontal cross-bar and having its curved ends spaced therefrom, side bars having inner curved ends attached to the curved ends of said bar attached to the cross-bar, extending the front ends towards the front part of the automobile, brackets for detachably attaching and holding said frame side bars to the front axle of the automobile, and rectangularly bent outer ends on said frame side bars to which said plow share bearing cross-bar is attached.

Signed at Nekoosa in the county of Wood and State of Wisconsin.

JAKOB HOJNOWSKI.